United States Patent
Loce et al.

(10) Patent No.: US 6,529,643 B1
(45) Date of Patent: Mar. 4, 2003

(54) SYSTEM FOR ELECTRONIC COMPENSATION OF BEAM SCAN TRAJECTORY DISTORTION

(75) Inventors: Robert P. Loce, Webster; Martin E. Banton, Fairport; Steven J. Harrington, Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/217,224

(22) Filed: Dec. 21, 1998

(51) Int. Cl.[7] .................................................. G06K 9/32
(52) U.S. Cl. ........................ 382/300; 382/296; 382/289; 358/525; 358/428
(58) Field of Search ................................ 382/300, 309, 382/293, 275, 294, 268, 317, 296, 289, 282, 274; 358/428, 258, 455, 525, 537, 538, 429

(56) References Cited

U.S. PATENT DOCUMENTS

| | | | | |
|---|---|---|---|---|
| 5,085,506 A | * | 2/1992 | Kahan et al. ................. | 353/122 |
| 5,264,943 A | | 11/1993 | Curry ......................... | 358/296 |
| 5,293,539 A | * | 3/1994 | Spence ........................ | 358/527 |
| 5,297,217 A | * | 3/1994 | Hamilton, Jr. et al. ......... | 382/41 |
| 5,430,472 A | | 7/1995 | Curry ......................... | 347/232 |
| 5,557,689 A | | 9/1996 | Huttenlocher et al. ....... | 382/177 |
| 5,640,466 A | | 6/1997 | Huttenlocher et al. ....... | 382/177 |
| 5,687,253 A | | 11/1997 | Huttenlocher et al. ....... | 382/177 |
| 5,687,254 A | | 11/1997 | Poon et al. .................. | 382/229 |
| 5,701,365 A | | 12/1997 | Harrington et al. .......... | 382/212 |
| 5,719,970 A | * | 2/1998 | Aoki et al. .................. | 382/313 |
| 5,732,162 A | | 3/1998 | Curry ......................... | 382/294 |
| 5,737,455 A | | 4/1998 | Harrington et al. .......... | 382/284 |
| 5,760,925 A | | 6/1998 | Saund et al. ................. | 358/497 |
| 5,764,383 A | | 6/1998 | Saund et al. ................. | 358/497 |
| 5,805,724 A | * | 9/1998 | Metcalfe et al. ............. | 382/176 |
| 5,929,892 A | * | 7/1999 | Towner et al. ............... | 347/255 |
| 6,069,707 A | * | 5/2000 | Pekelman .................... | 358/1.6 |

* cited by examiner

Primary Examiner—Bhavesh Mehta
Assistant Examiner—Yosef Kassa
(74) Attorney, Agent, or Firm—William Elpert

(57) ABSTRACT

A system for generating a warped contone image that compensates for beam scan trajectory distortions. The system includes an image buffer for storing a portion of a received contone image. An interpolation coefficient generator provides interpolation coefficients associated with a warped pixel within the warped contone image in response to an input identifying the warped pixel. A pixel interpolator is coupled to the image buffer and the interpolation coefficient generator and provides an output signal that identifies the warped pixel within the warped contone image. The pixel interpolator further retrieves pixels from the contone image stored in the image buffer using the interpolation coefficients and generates the warped pixel by combining the retrieved pixels into a single pixel value.

23 Claims, 5 Drawing Sheets

SYSTEM FOR ELECTRONIC COMPENSATION OF BEAM SCAN TRAJECTORY DISTORTION

CROSS REFERENCE

Cross reference is made to co-pending U.S. patent application Ser. No. 09/217,030 entitled "Edge Compaction In Antialiased Images" by Zhang et al.

BACKGROUND OF THE INVENTION

This invention generally relates to electronic registration and, more particularly, to a system to improve image registration by electronic compensation of raster output scanner beam scan trajectory distortions.

Electrophotographic marking is a well-known and commonly used method of copying or printing documents. In general, electrophotographic marking employs a charge-retentive, photosensitive surface, known as a photoreceptor, that is initially charged uniformly. In an exposure step, a light image representation of a desired output focused on the photoreceptor discharges specific areas of the surface to create a latent image. In a development step, toner particles are applied to the latent image, forming a toner or developed image. This developed image on the photoreceptor is then transferred to a print sheet on which the desired print or copy is fixed.

The electrophotographic marking process outlined above can be used to produce color as well as black and white (monochrome) images. Generally, color images are produced by repeating the electrophotographic marking process to print two or more different image layers or color image separations in superimposed registration on a single print sheet. This process may be accomplished by using a single exposure device, e.g. a raster output scanner (ROS), where each subsequent image layer is formed on a subsequent pass of the photoreceptor (multiple pass) or by employing multiple exposure devices, each writing a different image layer, during a single revolution of the photoreceptor (single pass). While multiple pass systems require less hardware and are generally easier to implement than single pass systems, single pass systems provide much greater print speeds.

In generating color images, the ability to achieve precise registration of the image layers is necessary to obtain printed image structures that are free of undesirable color fringes and other registration errors. Precise registration of image layers in a single pass machine requires precise registration from one ROS to the next. One major cause of misregistration in multiple ROS systems is the differences in the beam scan trajectory of each ROS in the imaging system.

In general, a conventional ROS repeatedly scans a data modulated light beam over a photoreceptor surface in accordance with a predetermined raster scanning pattern to generate an image. Typically, a conventional ROS includes a laser diode or similar device to generate a light beam that is modulated in response to received data. The ROS further includes a rotating polygonal mirror block to repeatedly scan the light beam across the photoreceptor. As the photoreceptor is advanced in a process direction, the ROS repeatedly scans the modulated light beam across the surface of the photoreceptor in a fastscan direction that is orthogonal to the process direction.

Ideally, each scan of the light beam across the photoreceptor (generally identified herein as a beam scan) traces a straight line across the surface of the photoreceptor that is substantially normal to the movement of the photoreceptor in the process direction. However, variations in the angular speed of the rotating polygonal mirror as well as variations in the geometry of the sidewalls or facets of the rotating mirror can introduce pixel positioning errors which distort the trajectory of each beam scan. Typically, each ROS introduces different pixel positioning errors that distort its beam scan. Thus, in a machine with more than one ROS, each ROS will likely have a different beam scan trajectory.

To achieve the registration necessary to generate color images that are free of undesirable registration errors, the beam scan trajectory of each ROS must be within a relatively tight bound such as ±5 microns of the beam scan trajectory of every other ROS. Such tight registration tolerances are very difficult and very expensive to achieve solely by opto-mechanical means within the ROS. Systems for compensation and/or correction of beam scan distortions to improve registration errors have been proposed. However, many of these proposed systems correct only one type of distortion and often are themselves complex and expensive to implement.

The following references may be found relevant to the present disclosure.

U.S. Pat. No. 5,430,472 to Curry discloses a method and apparatus for eliminating misregistration and bowing by controlling a composite light intensity profile and phase shifting of a spatial location at which the light intensity profile crosses a xerographic threshold in a two dimensional high addressability printer operating in an overscan mode.

U.S. Pat. No. 5,732,162 to Curry discloses a system for correcting registration errors in a printer with subscan precision. The system includes a memory device for storing sequential rasters of image data and an interpolator coupled to the memory device. The interpolator uses the rasters of image data from the memory device in conjunction with multiplication factors to calculate an interpolated resample value.

SUMMARY OF THE INVENTION

In accordance with the present invention, there is provided a system for generating a warped contone image that compensates for beam scan trajectory distortions. The system includes an image buffer for storing a portion of a received contone image. An interpolation coefficient generator provides interpolation coefficients associated with a warped pixel within the warped contone image in response to an input identifying the warped pixel. A pixel interpolator is coupled to the image buffer and the interpolation coefficient generator and provides an output signal that identifies the warped pixel within the warped contone image. The pixel interpolator further retrieves pixels from the contone image stored in the image buffer using the interpolation coefficients and generates the warped pixel by combining the retrieved pixels into a single pixel value.

In accordance with another aspect of the present invention, there is provided a printing system including a print engine that generates an output document in response to print ready data and an image processing system operating on image data representing an image to be printed to generate the print ready data supplied to the print engine. The image processing system includes a warping processor for generating a warped contone image that compensates for pixel positioning errors introduced by the print engine. The warping processor includes an image buffer coupled to receive and store a portion of the contone image, an interpolation coefficient generator providing an interpolation coefficient associated with a warped pixel within the warped contone image in response to an input signal identifying the warped pixel and a pixel interpolator coupled to the image buffer and the interpolation coefficient generator. The pixel interpolator provides an output signal identifying the warped pixel, retrieves pixels from the contone image stored in the image buffer in response to the interpolation coefficient associated with the warped pixel and generates the warped pixel by combining the retrieved pixels into a single pixel value.

In accordance with yet another aspect of the present invention, there is provided a method of realigning pixels within continuous tone image data to compensate for distortion in a beam scan trajectory of a first output scanner and improve image layer registration. The method comprises the steps of: receiving said continuous tone image data, said received continuous tone image data comprising a plurality of scanlines; identifying a warped pixel within a warped scanline; identifying pixels within said received continuous tone image data that compensate for said distortion in said beam scan trajectory; retrieving said identified pixel from said received continuous tone image data based on said desired output position; and generating said warped pixel from said retrieved pixels.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 1:
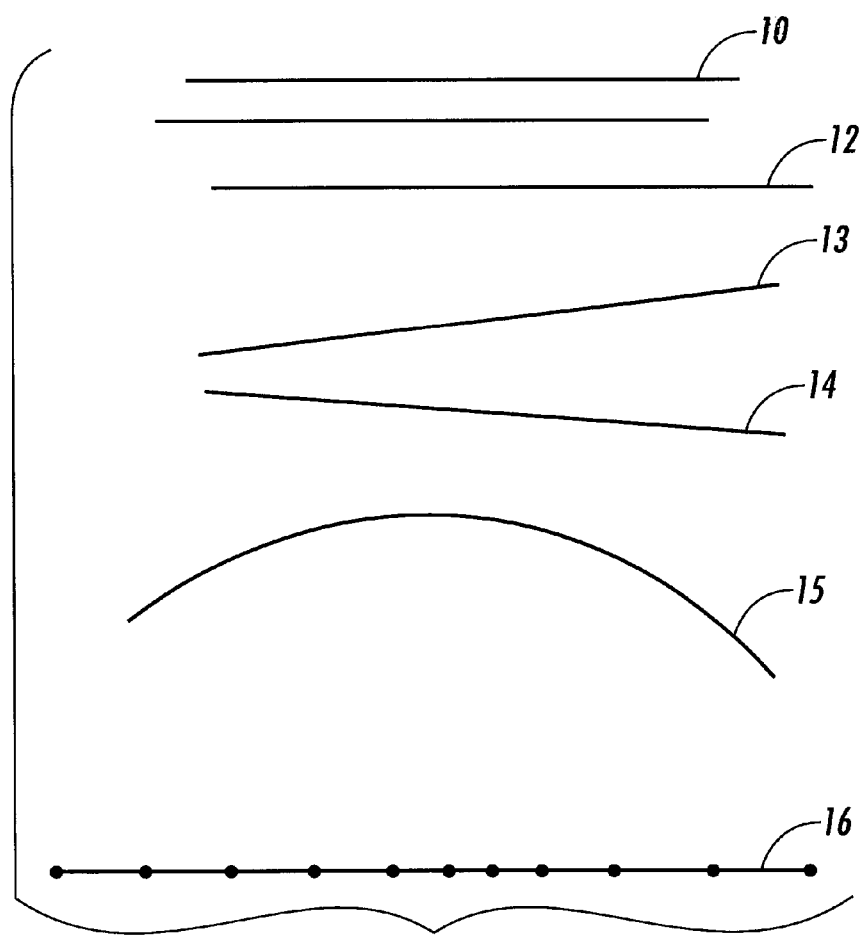
FIG. 1 illustrates four common types of ROS beam scan trajectory distortions that can be compensated for by the present invention.

For a general understanding of the present invention, reference is made to the drawings. In the drawings, like reference numerals have been used throughout to designate identical elements. In describing the present invention, the following terms have been used in the description.

A "beam scan" identifies one pass of a modulated light beam output from a ROS across a photoreceptor. The "beam scan trajectory" identifies the trace or path of a beam scan across the surface of the photoreceptor.

The present invention is described herein as processing continuous tone (contone) image data. However, it should be understood that the present invention applies equally well to the processing of color images, wherein each color image separation is treated, effectively, as a gray scale or contone image. Accordingly, references herein to the processing of contone images are intended to include the processing of color image separations as well. The contone image data comprises a plurality of scanlines each of which further comprises a plurality of multi-bit digital pixels. Each beam scan across the photosensitive surface by a ROS requires one scanline to modulate the light beam. For each pixel within a scanline, the ROS may write one or more spots on the photosensitive surface.

The present invention is described herein as compensating for distortions in the beam scan trajectory of a ROS. As used herein, distortion in a beam scan trajectory (beam scan trajectory distortion) refers to the geometric displacement of the pixel positions along the beam scan trajectory from the pixel positions along a reference beam scan trajectory. The reference beam scan trajectory may be any desired beam scan trajectory including the beam scan trajectory of a given ROS. It should be understood that compensating for distortions in the beam scan trajectory of a ROS is intended to cover removing distortions within the beam scan trajectory of the ROS such that the trajectory of the ROS matches that of the given ROS. Furthermore, it should be understood that removing distortions in the beam scan trajectory of a ROS to match the trajectory of one ROS to that of another is intended to cover removing pixel positioning errors in the beam scan trajectory as well as introducing pixel positioning errors into the beam scan trajectory.

To begin by way of general explanation, four common types of pixel positioning errors which distort ROS beam scan trajectories are illustrated in FIG. 1. Although the four types of distortions described below are shown separately for illustrative purposes, it is understood that beam scan trajectory can be distorted by any combination of one or more of the four types illustrated in FIG. 1. Each referenced line in FIG. 1 illustrates the trajectory of a beam scan across a photoreceptor in the fastscan (x) direction. Beam scan trajectories 10–12 illustrate a first type of distortion in which the placement of the beam scans are offset in the fastscan and/or process direction. As can be seen, each of the trajectories 10–12 has a slightly different starting point in the fastscan direction. Similarly, the position of beam scan trajectory 11 is offset in the process (y) direction such that the position of the beam scan is shifted toward beam scan trajectory 10.

A second type distortion is known as skew. With beam scan skew, some beam scans are generated at a slight angle with respect to other beam scans. Skew can be seen with beam scan trajectories 13 and 14, which are generated at a slight angle with respect to trajectories 10–12 as well as to each other. In a third beam scan distortion, referred to as bow, the trajectory of the beam scan is curved as illustrated by trajectory 15. Another type of distortion is nonlinearity of the beam scan. With a nonlinear beam scan, the distances separating the spots generated by the ROS are not uniform. The squeeze and stretch effect of a nonlinear beam scan is illustrated with beam scan trajectory 16 wherein the placement of spots along the beam are squeezed closer in the center of the beam scan and stretched apart at the ends. A fifth type of distortion, not illustrated in FIG. 1, is intensity variation across the beam scan. With this type of distortion, a ROS does not have the same output intensity at every point along the beam scan.

Figure 2:
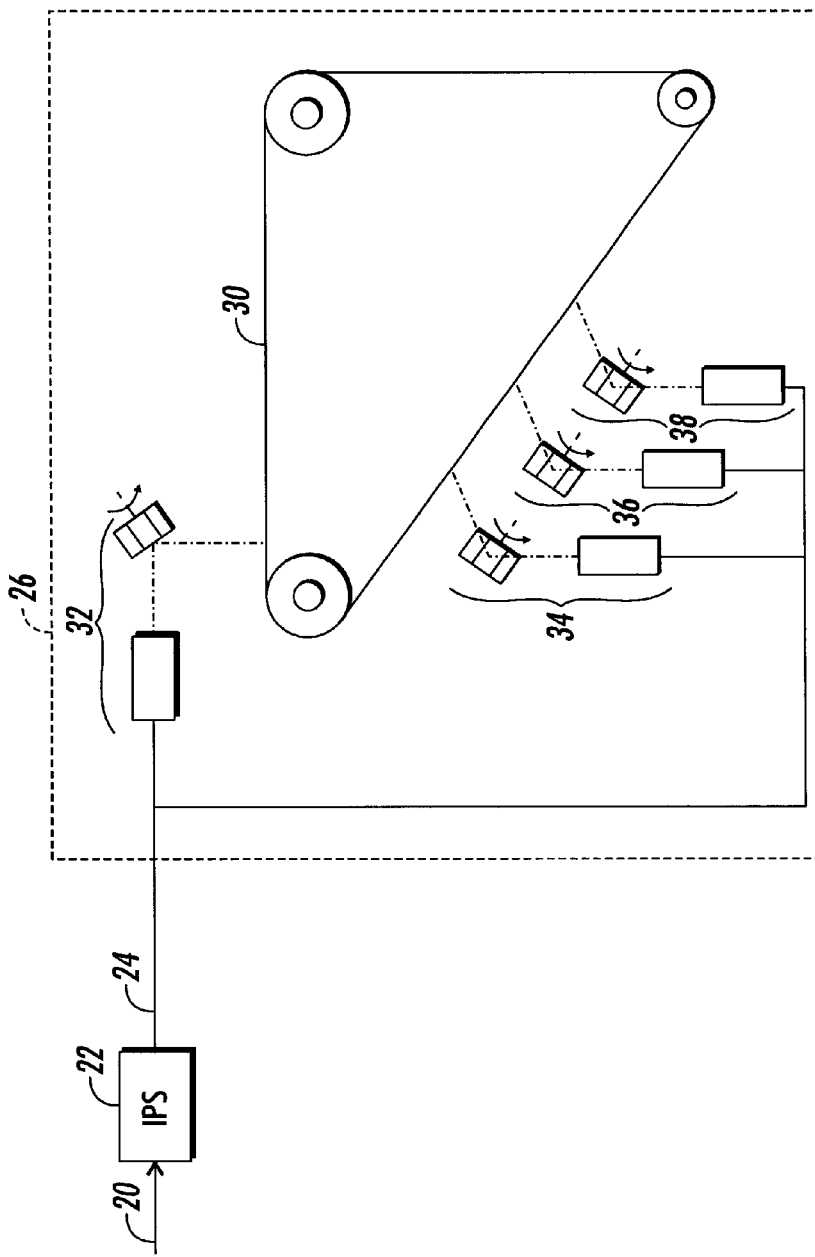
FIG. 2 is a schematic, elevational view of a printing machine incorporating the features of the present invention therein.

Turning now to FIG. 2, there is shown an embodiment of a printing machine 26 including a digital imaging system 5 that incorporates the features of the present invention. Image data 20 representing an image to be printed is received by an image processing system (IPS) 22 that may incorporate what is known in the art as a digital front end (DFE). IPS 22 process the received image data 20 to produce print ready binary data 24 that is supplied to a print engine 26. IPS 22 may receive image data 20 from an input scanner which captures an image from an original document, a computer, a network, or any similar or equivalent image input terminal communicating with imaging system 5.

Print engine 26 is beneficially an electrophotographic engine; however, it will become evident from the following discussion that the present invention is useful in a wide variety of copying and printing machines and is not limited in its application to the printing machine shown herein. Print engine 26 is shown as a multi-ROS engine which operates on the print ready binary data from IPS 22 to generate a color document in a single pass on a charge retentive surface in the form of photoreceptor belt 30. Briefly, the uniformly charged photoreceptor 30 is initially exposed to a light image which represents a first color image separation, such as black, at ROS 32. The resulting electrostatic latent image is then developed with black toner particles to produce a black toner image. This same image area with its black toner layer is then recharged, exposed to a light image which represents a second color separation such as yellow at ROS 34, and developed to produce a second color toner layer. This recharge, expose, and develop image on image (REaD IOI) process may be repeated at ROS 36 and ROS 38 to subsequently develop image layers of different colors, such as magenta and cyan.

The present invention is directed towards aspects of IPS 22 depicted in FIG. 2. In particular, the intention of the present invention is directed to the inclusion of a warping processor within IPS 22. The warping processor warps contone image data by realigning the pixels therein to compensate for ROS beam scan trajectory distortions and improve image layer registration such that color image separations print in register when written with scanners possessing different beam scan trajectory characteristics. IPS 22 may warp the contone image data such that each ROS appears to have written the image using the same beam scan trajectory. Alternatively, IPS 22 may warp the contone image data such that the image appears to have been written such that the beam scan trajectory of each "color" ROS matches the beam scan trajectory of the black ROS. Not warping the black image separation provides the advantage of obtaining precise registration of the image separations without generating unwanted artifacts that may arise when warping the black separation.

Figure 3:
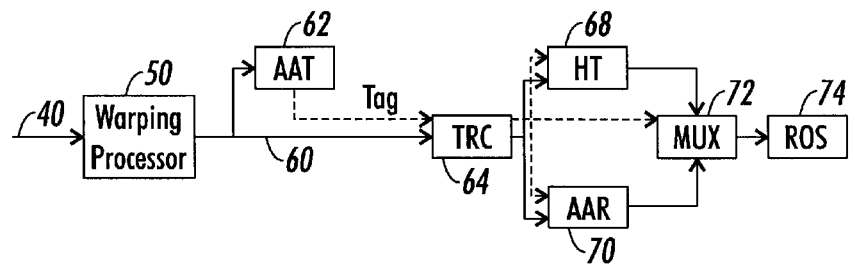
FIG. 3 illustrates a generalized data flow through an image print path in accordance with the present invention.

Referring now to FIG. 3, there is shown a block diagram illustrating the data flow through a contone image print path of IPS 22 modified to include a warping processor in accordance with the present invention. In particular, the data flow of FIG. 3 illustrates the contone image data 40 that would be received after IPS 22 performs image analysis and processing functions which may include background detection, segmentation, windowing, scaling, or color adjustment on the received image data 20 (FIG. 2). Contone image data 40 is passed to warping processor 50. Processor 50 warps contone image 40 to generate a warped contone image 60. Warped contone image 60 comprises a plurality of warped scanlines each of which further comprises a plurality of warped multi-bit digital pixels. Beneficially, the warped contone image 60 generated by processor 50 comprises the same number of scanlines and pixels per scanline as contone image data 40.

In general, warping processor realigns the pixels in contone image 40 into warped scanlines that compensate for distortions in the beam scan trajectory of a ROS. Briefly, for each warped pixel, warping processor 50 identifies the output position of the warped pixel based upon the beam scan trajectory of the ROS. From the output position, processor 50 identifies those pixels within contone image data 40 that will compensate for the ROS beam scan trajectory. Warping processor 50 then retrieves the identified pixels from contone image 40 and combines the retrieved pixels into a single warped pixel by interpolating or averaging the values of the retrieved pixels. Processor 50 generates warped image 60 by repeating the above for each warped pixel in a warped scanline and for each warped scanline within the warped image. The operation of warping processor 50 is described in further detail with reference to FIGS. 5–9.

After having warped contone image 40 to compensate for beam scan trajectory distortions, the warped contone image 60 is processed (rendered) into print ready binary data in the same manner as "unwarped" contone data. That is, the warped contone image 60 is supplied to anti-alias tagging (AAT) module 62 and tone reproduction curve (TRC) module 64. AAT module 62 tags the warped pixels determined to be antialiased and outputs the antialiased tag to TRC module 64. Since it is desirable to treat the rendering of a gray pixel differently depending on whether it represents an antialiased edge or a uniform area, it is necessary to classify the pixel. AAT module 62 conducts an analysis of the neighborhood of the gray pixels to determine if the gray pixel represents a true gray value or an antialiased edge. If the gray pixel occurs at an abrupt transition between dark and light regions (e.g., it has a nearly saturated pixel on one side and a background (white) pixel on the opposite side), then it is reasonable to assume that the pixel represents an antialiased edge. On the other hand, if the gray pixel's neighbors all have similar values, then it is probably a true gray value and not an antialiased edge.

At TRC module 64, the tags generated by AAT module 62 are employed in conjunction with the associated warped pixel values to modify the warped pixel values in a known manner. Subsequently, the modified pixels and their associated tags are passed to a pair of processing modules—halftoning module 68 and anti-aliased rendering (AAR) module 70. Halftoning module 68 converts the true gray pixels within the warped scanline into print ready data used to drive a ROS. AAR module 70 operates on the gray pixels tagged as an antialiased edge to convert the pixels to print ready data. Although depicted as parallel functions, the processing carried out therein may be accomplished using a single processing block operating serially. The tags are supplied to both modules to control processing therein, and are also used as a select signal in multiplexer 72. Multiplexer 72 selectively passes print ready data from halftoning module 68 or AAR module 70 to ROS 74 in response to the tags received from TRC module 64.

Figure 4:
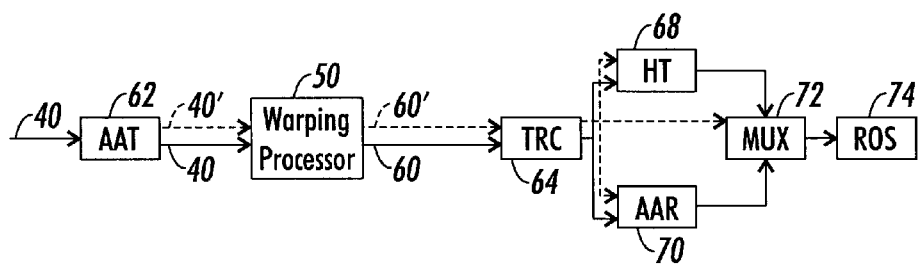
FIG. 4 illustrates a generalized data flow through a second image print path in accordance with the present invention.

FIG. 4 illustrates the data flow through a contone image print path wherein both the contone image data 40 and any associated antialiased tags 40' are warped. In FIG. 4, AAT module 62 is shown operating on contone image data 40 to generate antialiased tags that identify pixels as an antialiased edge. However, it is understood that antialiased tags 40' can be generated elsewhere and by means other than AAT module 62. For example, when image data is received from an input scanner, there may be tags associated with the scanned data that are passed to warping processor 50 along with the contone data.

Warping processor 50 receives contone image data 40 along with tags 40' and generates a warped contone image 60 and warped tags 60'. In general, warped scanlines are generated by interpolating between multi-bit digital pixels from one or more scanlines within contone image data 40. However, as tags have specific meanings, a technique such as interpolation cannot be used to generate warped tags 60'. Warping processor generates warped tags based upon the output position of the warped pixel with respect to the unwarped pixels used for interpolation.

The warped contone image 60 and warped tags 60' are then processed (rendered) into print ready binary data in a conventional manner through TRC module 64, halftoning module 68, AAR module 70 and multiplexer 72. That is, warped contone image 60 and warped tags 60' are coupled to TRC module 64 at which the pixel values within the warped scanlines are modified in a known manner. From TRC module 64, the modified pixels are passed to halftoning module 68 and AAR module 70. Halftoning module 68 processes the gray pixels within the warped scanline as true gray pixels to generate print ready data used to drive a ROS. AAR module 70 operates on the gray pixels tagged as an antialiased edge to convert the pixels to print ready data. TRC passes the warped tags as a select signal to multiplexer 72. Multiplexer 72 responds to the tags to pass the appropriate print ready data to ROS 74.

Figure 5:
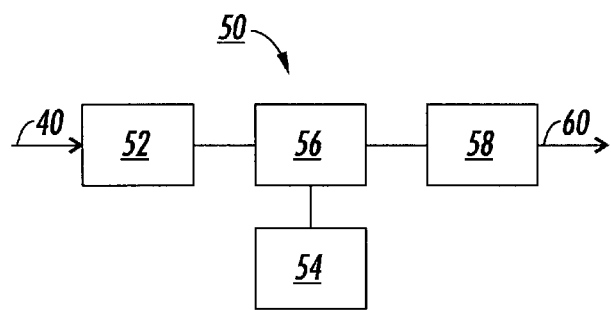
FIG. 5 is a block diagram of a warping processor in accordance with the present invention.

Referring now to FIG. 5, there is shown an embodiment of warping processor 50 in accordance with the present invention. Warping processor 50 is shown comprising image buffer 52, interpolation coefficient generator 54, pixel interpolator 56 and edge restorer 58. Image buffer 52 receives contone image data 40 along with any tags from IPS 22 and buffers a portion of the image data necessary for generating warped pixels. Buffer 52 is beneficially a high speed, FIFO-type memory for storing a portion of contone image 40 and any associated tags. In one embodiment, buffer 52 stores several scanlines of the contone image along with any associated tags.

Interpolation coefficient generator 54 provides interpolation coefficients that identify the pixels within contone image 40 used generate each warped pixel within the warped image. Beneficially, coefficient generator 54 identifies pixels within contone image 40 that compensate for the beam scan trajectory distortion of a given ROS by tracing the beam scan trajectory of the ROS across an ideal pixel grid for the desired beam scan trajectory. An ideal pixel grid for a desired trajectory indicates where each pixel in contone image 40 would be written with a desired beam scan trajectory. Stepping along the beam scan trajectory of the ROS at interval equal to pixel position identifies the output position of the warped pixels with respect to the ideal pixels. The intersections of the pixels along the trajectory with the pixels within the ideal pixel grid identify those pixels within the contone image needed to compensate for the beam scan trajectory of the given ROS. This method of identifying pixels is illustrated in FIG. 6.

Figure 6:
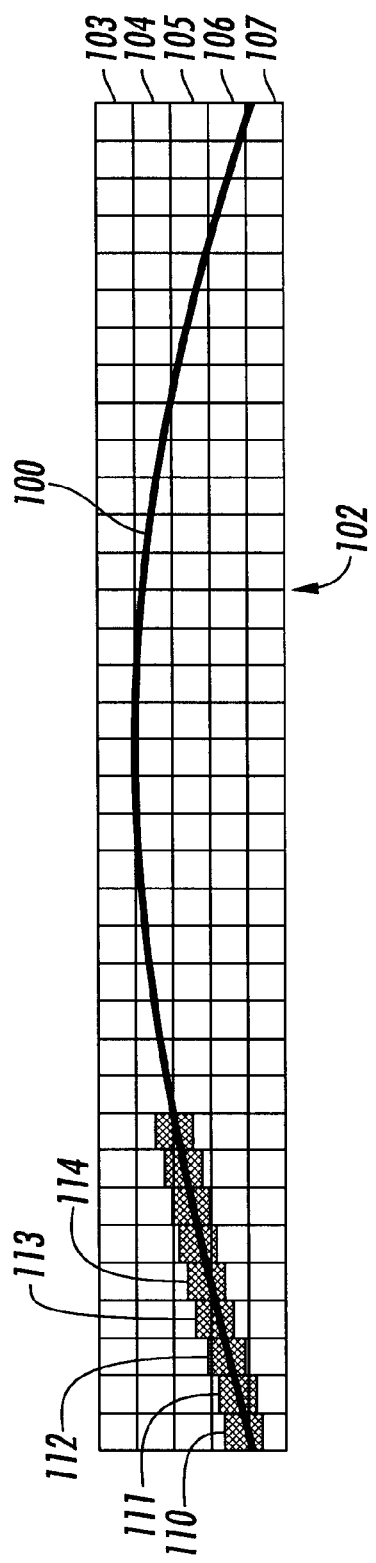
FIG. 6 is a schematic illustration of the identification of pixels that compensate for distortions in the beam scan trajectory of a ROS.

In FIG. 6, there is shown a bowed beam scan trajectory 100 traced across an ideal pixel grid 102 for a desired beam scan trajectory without distortion. Each of the rows 103–107 within grid 102 represents one scanline of contone image 40. Pixels 110–114, each of which corresponds to a warped pixel, illustrate the output position of pixels along trajectory 100. The intersections of pixels 110–114 with the pixels within grid 102 identify the pixels from which the values of the warped pixels are obtained. That is, the value for pixel 110 is determined by interpolation of the first pixels within scanlines 106 and 107.

Returning to FIG. 5, the interpolation coefficients for any warped pixel can be easily identified from the beam scan trajectory of the ROS by defining a compensated trajectory that describes the trajectory of the ROS relative to the ideal pixel grid for a desired beam scan trajectory. In one embodiment, interpolation coefficient generator 54 stores compensated trajectory values that provide an output position (either relative or absolute) for each pixel along the trajectory. In this embodiment, the compensated trajectory values can define the pixel position by its coordinates $x(p)$, $y(p)$. The $x(p)$ and $y(p)$ values are then decomposed into integer and fraction components from which the output position of the pixels with respect the ideal pixel grid can be identified and the interpolation coefficients obtained.

To simplify this embodiment, the compensated trajectory can beneficially be defined by interpolation coefficients stored as offsets from a given contone scanline. That is, assuming trajectory 100 represents the trajectory for warped scanline n and row 105 represents the $n^{th}$ scanline within the contone image data, the compensated trajectory may indicate a pixel offset value for each pixel along the trajectory, for example, 1.5 pixels in the y direction for pixel 110, 1.3 pixels for pixel 111, and 0.9 pixels for pixel 112. By similarly storing information for the offset in the fastscan (x) direction as well as information on intensity weighting (w) used to scale the warped pixel value, any trajectory having any distortion can be described. With such an embodiment, coefficient generator 54 would need to store three pixel offset values for each pixel. However, as beam scan trajectory tends to be a slowly varying function, the pixel offset values (interpolation coefficients) may be constant, within a reasonable degree of accuracy, over a significant number of pixels. Thus, this method of storing the trajectory may allow for compact storage of the interpolation coefficients.

In another embodiment, interpolation coefficient generator 54 models the compensated trajectory as a curve and stores a few curve-defining parameters to generate the trajectory. For example, the compensated trajectory might be modeled as a quadratic where the location of warped pixel p in the process direction is given by:

$$y(p)=y_2p^2+y_1p+y_0 \quad (1)$$

In modeling the trajectory in this manner, the overall vertical registration is adjusted through $y_0$, beam scan skew is modeled using $y_1$, and $y_0$ and a bowed trajectory is modeled by $y_2$, $y_1$, and $y_0$. The squeeze and stretch of a nonlinear beam scan in the fastscan (x) direction can be modeled using a cubic:

$$x(p)=x_3p^3+x_2p^2+x_1p+x_0 \quad (2)$$

Similarly, the intensity weighting information $w(p)$ may be modeled as a quadratic or a cubic as needed.

The generation of quadratic and cubic polynomial functions is well known and easy to implement in hardware or software. One method, commonly used to generate curves in computer graphics, is called stepping, and can be carried out by a chain of additions to registers. For example, a quadratic stepper would perform the following:

$$s_1=s_1+a_1 \quad (3)$$

$$s_2=s_2+s_1+a_2 \quad (4)$$

where $a_1$ and $a_2$ are constant values related to the polynomial coefficients. The constants, $a_1$ and $a_2$, together with the initial values for $s_1$ and $s_2$ determine the behavior of the quadratic curve. For a cubic generator a third line, given by:

$$s_3 = s_3 + s_2 + s_1 + a_3 \quad (5)$$

is needed.

With this embodiment, the stepping parameters are set to define the beam scan trajectory with respect to the desired trajectory. That is, the stepping parameters define a compensated trajectory. The compensated trajectory is then generated by iterating the stepping functions given by equations (3), (4), and (5). The stepping functions produce the values of y(p), x(p), and w(p) for each step p. The x(p) and y(p) values are then decomposed into integer and fraction components from which the interpolation coefficients are obtained. Here, again, the compensated trajectory can be defined as an absolute trajectory or as a relative trajectory an provide an output position for each pixel along the trajectory or the compensated trajectory can be defined by interpolation coefficients and thereby provide offsets from a given contone scanline.

Pixel interpolator 56 generates warped pixels by combining multi-bit digital pixels from within contone image 40 into a single pixel. Furthermore, if processor 50 receives tags with the contone image, pixel interpolator 56 generates warped tags by combining the tags. Pixel interpolator 56 also controls generation of the warped image and the flow of data within processor 50. To generate a warped pixel, pixel interpolator identifies the current warped pixel to be generated and obtains the interpolation coefficients for the current warped pixel from coefficient generator 54. Using those interpolation coefficients, interpolator 56 retrieves pixels (and any associated tags) from the contone image scanlines stored in image buffer 52.

Pixel interpolator 56 first combines the retrieved pixels into a single warped pixel by averaging or interpolating the values of the retrieved pixels and then combines the retrieved tags into a single tag based upon the position of the warped pixel with respect to the unwarped pixels. In its simplest form, pixel interpolator obtains the value of the warped pixel by averaging the values of the retrieved pixels. In a more robust combination, pixel interpolator 56 obtains the value of the warped pixel by interpolating over the pixels intersected by the warped pixel. If compensation for the beam scan trajectory is performed in only one direction, e.g., the process direction, then linear interpolation between two pixels is needed to obtain the warped pixel value. However, if the beam scan trajectory requires compensation in both the fastscan and process directions, interpolator 56 performs a bilinear interpolation over the four pixels intersected by the warped pixel.

Figure 7:
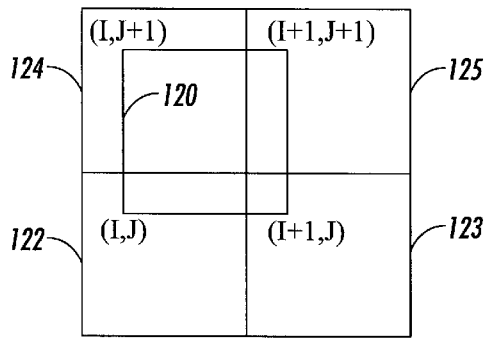
FIG. 7 shows the intersection of a warped pixel with four pixels within an ideal pixel grid.

The bilinear interpolation operation is described with additional reference to FIG. 7 in which there is illustrated the position of warped pixel 120 with respect to pixels 122, 123, 124, and 125 within an ideal pixel grid. If the output position of a pixel is defined by its coordinates x(p), y(p), the output position with respect to the ideal pixel grid can be identified from the floor function:

$$i(p) = floor(x(p)), j(p) = floor(y(p)) \quad (6)$$

Using the floor function given above, the ideal pixels are given by I(i, j), I(i+1, j), I(i, j+1), I(i+1, j+1) wherein the parameter p is left understood. If warped pixel 120 is located at x, y and the values of the four pixels 122–125 are given by I(i, j), I(i+1, j), I(i, j+1), I(i+1, j+1), respectively, the bilinear interpolation output R for the warped pixel value is given by:

$$R = I(i,j) + f(I(i+1,j) - I(i,j)) + g(I(i,j+1) - I(i,j)) + fg(I(i+1,j+1) - I(i+1,j) - I(i,j+1) + I(i,j)) \quad (7)$$

wherein f and g are interpolation weights given by the fractional parts of x and y as:

$$f = x - i, \text{ and } g = y - j. \quad (8)$$

Returning to FIG. 5, if the warping processor receives tags with the contone image data, pixel interpolator 56 combines the tags based upon the position of the warped pixel with respect to the unwarped pixels used for interpolation. Beneficially, the warped tag takes the tag of the unwarped pixel within the ideal pixel grid that is closest to the position of the warped pixel. For example, if the output position of a warped pixel 120 with respect to the unwarped pixels 122, 123, 124, and 125 is as shown FIG. 7, the warped tag would take the tag associated with pixel 124. This process can be extended to combine the tags of the four pixels using a fuzzy logic approach.

Edge restorer 58 operates on the warped image generated at pixel interpolator 56 to restore (compact) edges that may have been expanded during interpolation. The pixel interpolation performed by interpolator 56 often introduces gray pixels to an edge. If an edge already possesses gray pixels due to antialiasing, interpolation may widen the gray border to two pixels. Current implementations of antialiased tagging and antialiased rendering do not recognize this broad edge as being antialiased, and thus will be halftoned to yield an undesirable beaded structure. Edge restorer 58 identifies these wide borders and restores the edge to one gray pixel in width.

Edge restorer 58 operates on the warped contone image to compact gray edges that are two pixels wide to edges that are one pixel wide. In particular restorer 58 focuses on the processing of a warped pixel when it has been determined to be a gray pixel within a two pixel wide gray edge. Edge restorer 58 operates on the warped contone image data to identify and process accordingly gray pixels within a diffuse gray edge. Edge restorer 58 analyzes a target pixel and a group of pixels neighboring or surrounding the target pixel to determine whether the target pixel is within a diffuse gray edge. A diffuse gray edge is presumed to be present when at least two gray pixels are present between a transition from a nearly saturated (black) pixel to a background (white) pixel. An affirmative determination will result in a subsequent compaction operation wherein the gray from one or more gray pixels more distant to the saturated pixel is shifted (donated) to the gray pixel adjoining the saturated pixel. Assuming pixels A and B are gray pixels within a diffuse gray edge with pixel B adjacent to a saturated pixel and the value of a saturated pixel is 255, gray can be shifted between pixels A and B according to:

$$B' = \min(255, B + A) \quad (9)$$

$$A' = A - [\min(255, B + A)] + B = A - B' + B \quad (10)$$

wherein A' and B' are the values of the pixels after shifting gray. More information on compacting diffuse gray edges and details on methods for identifying and compacting pixels within diffuse gray edges can be found in co-pending, commonly assigned U.S. patent application No. Ser. No. 09/217,035 entitled "Edge Compaction In Antialiased Images" by Zhang et al., which is hereby incorporated by reference herein.

In operation, warping processor 50 generates a warped contone image that compensates for the beam scan trajectory of a predetermined ROS. The generation of a warped image begins with the identification of the current warped pixel to be generated. In its simplest form, the current warped pixel to be generated is identified by the warped scanline and the pixel position within the scanline that the warped pixel is located.

Next, the interpolation coefficients for the current warped pixel are obtained. As previously described, the interpolation coefficients for any warped pixel can be easily identified from the beam scan trajectory of the ROS by defining the trajectory relative to the ideal pixel grid. Additionally, if the ROS is multibeam, a trajectory for each beam may be stored. Furthermore, a different trajectory for each facet may also be identified. Based upon the identification of the warped scanline, the beam and facet writing the warped scanline can be determined, and the appropriate beam scan trajectory is retrieved. From the trajectory, the interpolation coefficients can be determined based upon the position of the warped pixel within the warped scanline.

Having determined the interpolation coefficients, the pixels, and any associated tags, corresponding to the coefficients are retrieved from the contone image data stored in buffer 52. The retrieved multi-bit digital pixels from the contone image are combined into a single multi-bit warped pixel. As described above, the retrieved pixels can be combined by interpolating the values of the retrieved pixels. Processor 50 repeats the above steps for each warped pixel in a warped scanline and for each warped scanline within the warped image. After generating a number of warped scanlines, warping processor begins to identify and compact any gray edges that are two pixels wide to edges that are one pixel wide.

Figure 8:
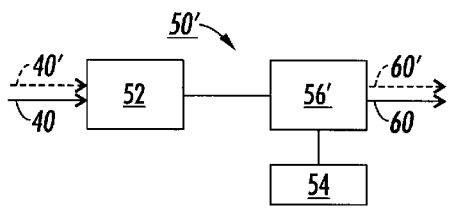
FIG. 8 is a block diagram of another embodiment of a warping processor in accordance with the present invention.

Referring now to FIG. 8, there is shown another embodiment of a warping processor in accordance with the present invention. In FIG. 8, warping processor 50' is shown comprising image buffer 52, interpolation coefficient generator 54 and pixel interpolator 56'. Warping processor 50' is particularly beneficial when antialiased tags are received with the contone image data as shown in FIG. 4. Briefly reviewing, antialiasing is a technique of using intermediate levels of intensity to estimate the edges of lines and text. The intensity of the pixel indicates the amount of the pixel covered by the object. A major benefit of antialiased images is that edges of high contrast, saturated objects may include pixels possessing intermediate gray values that visually suggest a higher resolution of object edges. If a gray pixel represents an antialiased edge, then a change in the position of the beam scan trajectory becomes a change of the edge location within a pixel.

As described above, the warping processor of FIG. 5 estimates the change in the edge location using edge restorer 58 to shift gray from a pixel more distant to a saturated pixel to a gray pixel adjoining the saturated pixel. However, if the pixels are tagged as antialiased before being passed to the warping processor, the antialiased tags can be employed to estimate the edge location within unwarped pixels. Thus, when identifying the output position of the warped pixel with respect to the unwarped pixels, one can easily determine the edge location within the warped pixels and therefor the location of the edge within the warped image. In warping processor 50', pixel interpolator 56' employs a super-resolution technique wherein unwarped pixels are expanded into super-resolution patterns. For pixels tagged as antialiased, the expansion identifies (estimates) the location of edges within the expanded pixels. Once expanded, the output position of the warped pixel with respect to the expanded pixels is determined and the value of the warped pixel is generated based upon the super-resolution pattern within the warped pixel.

In FIG. 8, image buffer 52 and interpolation coefficient generator 54 operate in substantially the same manner as described above. That is, image buffer 52, which is beneficially a high speed, FIFO-type memory, receives contone image data 40 along with any tags 40' from IPS 22 and buffers a portion of the image data necessary for generating warped pixels. Interpolation coefficient generator 54 provides interpolation coefficients that identify the pixels that compensate for beam scan trajectory distortion of a given ROS by defining a compensated trajectory that describes the trajectory of the ROS relative to the ideal pixel grid for a desired beam scan trajectory. Interpolation coefficient generator 54 can store the compensated trajectory or generate the compensated trajectory from curve defining parameters.

Pixel interpolator 56' generates warped pixels by combining multi-bit digital pixels from within contone image 40 into a single pixel. Pixel interpolator 56' also controls generation of the warped image and the flow of data within processor 50'. To generate a warped pixel, pixel interpolator identifies the current warped pixel to be generated and obtains the interpolation coefficients for the current warped pixel from coefficient generator 54. Using those interpolation coefficients, interpolator 56' retrieves pixels and any associated tags from the contone image scanlines stored in image buffer 52.

Figure 9:
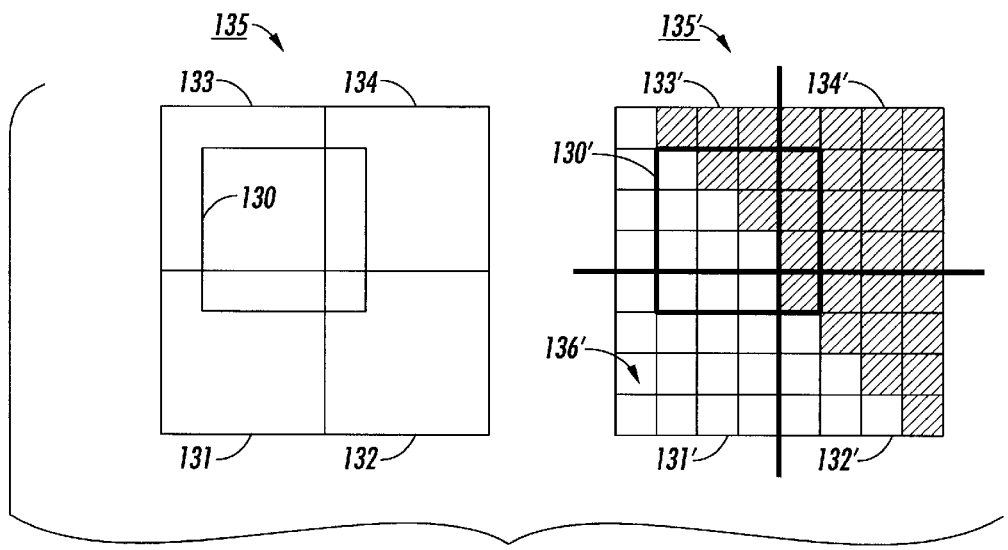
FIG. 9 is an illustration of the expansion of pixels into super-resolution patterns.

If none of the retrieved pixels are tagged as antialiased pixels, interpolator 56' combines the pixels using the previously described interpolation techniques. When antialiased tags are received with the contone image data, pixel interpolator 56' combines the pixels and the tags with a single interpolation step employing a super-resolution technique. This single step interpolation method employing super-resolution of pixels will be described with additional reference to FIG. 9. In FIG. 9, grid 135 illustrates the original pixels of which pixels 132 and 133 are tagged as antialiased. The expansion of the original pixels into super-resolution patterns is illustrated with grid 135'.

The four ideal pixels 131–134 are then expanded into super-resolution patterns in which the intensity of each expanded pixel 131'–134' is represented by sub-pixels 136' positioned within a super-resolution grid. In FIG. 9, a cross-hatched sub-pixel represents a saturated or near-saturated sub-pixel, and an unfilled (white) sub-pixel identifies a background sub-pixel. Once expanded, the output position of the warped pixel 130 with respect to the ideal pixels 131–134 is determined as described above. The warped pixel value can then be determined by averaging the sub-pixels contained within the warped pixel. If the warped pixel contains an edge, then the pixel is tagged as antialiased.

The determination of the expansion pattern for a pixel tagged as antialiased can be determined based on the intensities of the tagged pixel and its neighbors. Methods for expanding tagged pixels are described in U.S. Pat. No. 5,737,455 to Harrington, et al. and U.S. Pat. No. 5,701,365 to Harrington, et al which are incorporated by reference herein. If antialaising is applied only for edges between black and white, the determination of the pixel expansion pattern can be accomplished by table lookup. The index to the table is constructed from the intensity of the tagged pixel and that of its four immediate neighbors. If the pixel intensity is expanded by four there are 17 possible intensity levels which can be created from the 16 black and white sub-pixels. Thus, the intensity of a tagged pixel can be quantized to 17 levels and the intensity of the four neighboring pixels can be quantized to three levels—black, white, or gray—yielding 1377 table entries (3×3×3×3×17). Each entry in the table comprises a 16 bit bitmap of the expanded pixel pattern. After the four expanded pixel patterns are assembled, the expanded pixel pattern for the warped pixel is generated by shitting and masking operations. The output intensity of the warped pixel is then determined by averaging the sub-pixels within the expanded pixel pattern of the warped pixel. The existence of both black and white pixels within the warped pixel indicates that the warped pixel contains an edge and should he tagged as antialiased.

As described above, a simplified expansion method applies when the pixels are either black, white or tagged. To consider the case when the pixels further comprise non-antialiased gray pixels, an approach to expanding the gray pixels must be adopted. One such approach treats the non-antialiased gray pixels as either black or white in determining the expansion pattern of antialiased pixels while expanding the non-antialiased gray pixels based upon their intensity using a dither pattern or using sub-pixels having the same intensity as the non-antialiased gray pixel. To determine the expansion pattern for an antialiased gray pixel, a non-antialiased gray pixel is treated as black unless its intensity is lighter than the antialiased gray pixel—in which case the non-antialiased gray pixel is treated as white. After expanding the antialiased pixels, the non-antialiased gray pixels are expanded using a dither pattern to represent the gray level. Alternatively, the gray level can be represented using sub-pixels having the same intensity as the non-antialiased gray pixel. The four expanded pixel patterns are then assembled, and the output position of the warped pixel with respect to the expanded pixels is determined. The intensity level of the warped pixel can then be obtained by averaging the sub-pixels in the same manner described above.

In operation, warping processor 50' generates a warped contone image 60 that compensates for the beam scan trajectory distortions of a predetermined ROS. The generation of a warped image begins with the identification of the current warped pixel to be generated. Next, the interpolation coefficients for the current warped pixel are obtained and based on these interpolation coefficients, the pixels, and any associated tags, are retrieved from the contone image data stored in buffer 52.

The retrieved multi-bit digital pixels from the contone image are then combined into a single multi-bit warped pixel at interpolator 56'. If none of the retrieved pixels are tagged as antialiased, pixel interpolator 56' combines the retrieved pixels into a single warped pixel by averaging or interpolating the values of the retrieved pixels. However, if one or more of the retrieved pixels are tagged as antialiased, pixel interpolator 56' combines the retrieved pixels into a single warped pixel using a super-resolution technique. With a super-resolution technique, black pixels are expanded to all black sub-pixels and white pixels are expanded to all white pixels. Antialiased gray pixels are expanded into a predetermined pattern based upon the intensity of the antialiased gray pixel and the intensities of the pixels neighboring the antialiased gray pixel. Gray pixels which are not tagged as antialiased are expanded either into a predetermined dither pattern based upon the intensity or expanded into sub-pixels having the same intensity as the non-antialiased gray pixel The position of the warped pixel with respect to the expanded pixels is determined, and the intensity of the warped pixel is determined by averaging the intensities of the sub-pixels contained within the warped pixel.

What is claimed is:

1. A system for generating a warped contone image that compensates for beam scan trajectory distortions, comprising:

an image buffer coupled to receive a contone image, said image buffer storing a portion of said contone image;

an interpolation coefficient generator providing an interpolation coefficient associated with a warped pixel within said warped contone image in response to an input signal uniquely identifying said warped pixel, said interpolation coefficient identifying a position within said image buffer that corresponds to the intersection of a position of the warped pixel along a beam scan trajectory of an output scanner with an ideal pixel grid describing a desired beam scan trajectory; and a pixel interpolator coupled to said image buffer and said interpolation coefficient generator, said pixel interpolator providing said input signal uniquely identifying said warped pixel, retrieving pixels from said contone image stored in said image buffer in response to said interpolation coefficient associated with said warped pixel and generating a value for said warped pixel by combining said retrieved pixels into a single pixel value.

2. The system according to claim 1, wherein said interpolation coefficient generator stores an interpolation coefficient as an offset from a predetermined position within said contone image for a plurality of pixels along a beam scan trajectory.

3. The system according to claim 1, wherein said interpolation coefficient generator stores output position coordinates for said warped pixel.

4. The system according to claim 1, wherein said interpolation coefficient generator generates a compensated trajectory for said output scanner and identifies said interpolation coefficient from said generated trajectory.

5. The system according to claim 1, wherein said pixel interpolator combines said retrieved pixels into a single pixel by interpolating the values of the retrieved pixels.

6. The system according to claim 5, wherein said pixel interpolator performs a bilinear interpolation operation to combine the retrieved pixels into single pixel.

7. The system according to claim 1, wherein said pixel interpolator further retrieves tags associated with said retrieved pixels from said contone image stored in said image buffer and generates a warped tag based on a position of said warped pixel.

8. The system according to claim 1, wherein said pixel interpolator combines said retrieved pixels into said single pixel by generating an expanded pixel pattern for each retrieved pixel, determining an output position for said warped pixel with respect to said retrieved pixels and determining an expanded pixel pattern for said warped pixel.

9. The system according to claim 8, wherein said pixel interpolator further retrieves tags associated with said retrieved pixels from said contone image and wherein said expanded pixel patterns are generated as a function of said retrieved tags.

10. A printing system, comprising:

a print engine generating an output document in response to print ready data; and an image processing system operating on image data representing an image to be printed to generate said print ready data, said image processing system including a warping processor for generating a warped contone image that compensates for pixel positioning errors introduced by an output scanner in said print engine, wherein said warping processor comprises:

an image buffer coupled to receive a contone image, said image buffer storing a portion of said contone image;

an interpolation coefficient generator providing an interpolation coefficient associated with a warped pixel within said warped contone image in response to an input uniquely identifying said warped pixel, said interpolation coefficient identifying a position within said image buffer that corresponds to the intersection of a position of the warped pixel along a beam scan trajectory of said output scanner with an ideal pixel grid; and a pixel interpolator coupled to said image buffer and said interpolation coefficient generator, said pixel interpolator providing an output uniquely identifying said warped pixel, retrieving pixels from said contone image stored in said image buffer in response to said interpolation coefficient associated with said warped pixel and generating a value for said warped pixel by combining said retrieved pixels into a single pixel value.

11. The system according to claim 10, wherein said interpolation coefficient generator stores a compensated trajectory, said compensated trajectory identifying said pixel positioning errors relative to an ideal pixel grid.

12. The system according to claim 11, wherein said interpolation coefficient generator stores said compensated trajectory as a set of pixel offset values.

13. The system according to claim 10, wherein said pixel interpolator combines said retrieved pixels into a single pixel by interpolating the values of the retrieved pixels.

14. The system according to claim 13, wherein said pixel interpolator performs a bilinear interpolation operation to combine the retrieved pixels into single pixel.

15. The system according to claim 10, wherein said pixel interpolator further retrieves tags associated with said retrieved pixels from said contone image stored in said image buffer and generates a warped tag based on a position of said warped pixel.

16. The system according to claim 10, wherein said pixel interpolator combines said retrieved pixels into said single pixel by generating an expanded pixel pattern for each retrieved pixel, determining an output position for said warped pixel with respect to said retrieved pixels and determining an expanded pixel pattern for said warped pixel.

17. The system according to claim 16, wherein said pixel interpolator further retrieves tags associated with said retrieved pixels from said contone image and wherein said expanded pixel patterns for each retrieved pixel are generated as a function of said retrieved tags.

18. A method of realigning pixels within continuous tone image data to compensate for distortion in a beam scan trajectory of a first output scanner and improve image layer registration, comprising the steps of:

receiving said continuous tone image data, said received continuous tone image data comprising a plurality of scanlines;

identifying a warped pixel within a warped scanline;

identifying pixels within said received continuous tone image data that compensate for said distortion in said beam scan trajectory;

retrieving said identified pixel from said received continuous tone image data based on said desired output position; and generating said warped pixel from said retrieved pixels.

19. The method of claim 18, wherein said step of identifying pixels within said received continuous tone image data comprises:

identifying said beam scan trajectory for said first output scanner;

identifying a desired beam scan trajectory; and determining a compensated beam scan trajectory as a function said beam scan trajectory for said first output scanner and said a desired beam scan trajectory.

20. The said method of claim 19, wherein said step of generating said warped pixel from said retrieved pixels combines said retrieved pixels into a single pixel by interpolating between said retrieved pixels.

21. The said method of claim 19, wherein said step of generating said warped pixel from said retrieved pixels comprises:

generating expanded pixel patterns for said retrieved pixels;

determining an output position for said warped pixel with respect to said expanded pixel patterns;

determining an expanded pixel pattern for said warped pixel; and determining a value for said warped pixel based on the expanded pixel pattern for said warped pixel.

22. The said method of claim 21, wherein said step of generating said warped pixel from said retrieved pixels further comprises retrieving tags from said received continuous tone image data and wherein said expanded pixel patterns are generated as a function of said retrieved tags.

23. The method of claim 22, wherein said desired beam scan trajectory matches a beam scan trajectory of a second output scanner.

* * * * *